Patented Mar. 30, 1954

2,673,880

UNITED STATES PATENT OFFICE 2,673,880

PRODUCTION OF AMINO HYDROXY COMPOUNDS

Earl J. Eldred and Kenneth Johnson, Peoria, Ill., assignors to Commercial Solvents Corporation, Terre Haute, Ind., a corporation of Maryland No Drawing. Application August 7, 1951,
Serial No. 240,806

4 Claims. (Cl. 260—584)

Our invention relates to a process for the production of amino hydroxy compounds by hydrogenation of nitro hydroxy compounds. More particularly it relates to an improved process for producing amino hydroxy compounds by continuous addition of nitro hydroxy compounds to a hydrogenation vessel, and hydrogenating in the presence of a small amount of carbon dioxide.

The preparation of amino hydroxy compounds by hydrogenation of the corresponding nitro hydroxy compounds under certain conditions is well known. Johnson (U. S. P. No. 2,157,386) described a method for preparing amino hydroxy compounds by the liquid phase hydrogenation of nitro hydroxy compounds, in the presence of a suitable hydrogenation catalyst. According to his process, the nitro hydroxy compound and catalyst, together with a solvent, are introduced into a suitable pressure hydrogenation apparatus and sealed. The reaction vessel is equipped with means for the introduction of hydrogen gas under pressure, and for heating and cooling. Agitation during hydrogenation is said to be desirable in order to insure thorough mixing of the nitro hydroxy compound, the hydrogen gas, and the catalyst. Hydrogen gas is introduced until the hydrogenation is complete, at which time the reaction mixture is removed from the apparatus and the desired amino compounds separated.

Johnson's process, while being a relatively efficient method for the hydrogenation of nitro hydroxy compounds, is subject to certain disadvantages. For example, the time required for complete hydrogenation is long, yields are not as high as desirable and catalyst life is usually short.

The disadvantages inherent in the Johnson process are almost entirely eliminated by the process described and claimed in copending application U. S. Serial No. 90,046, filed April 27, 1949, now Patent No. 2,587,572, by Philip F. Tryon. According to the Tryon process, instead of placing the entire charge to be hydrogenated into the reaction vessel, the nitro hydroxy compound is added to the reaction vessel at a relatively slow rate. In particular, the nitro hydroxy compound is added only as fast as it can be hydrogenated, so that the concentration of nitro hydroxy compound present in the reaction vessel remains near zero.

By the use of the Tryon process, yields of amino hydroxy compounds of 80–90% can be obtained in large-scale hydrogenations as compared to yields of 40–50% obtained by the Johnson "batch" process. We have now discovered that by carrying out the hydrogenation in the presence of a small quantity of carbon dioxide yields well above 90% can consistently be obtained in large-scale hydrogenations. In addition, the quality of the hydrogenation products is improved by employing our new process. For example, the color of the product using our new procedure is consistently from 0–5 APHA as compared to 10–20 when using the prior art processes. One of the most beneficial results of using small amounts of carbon dioxide, however, lies in the prolongment of catalyst life. In large-scale plant operations catalysts can be used from 6 to 9 times, then reactivated. The reactivations can also be repeated. The catalyst usage then becomes a question of making up handling losses rather than replacing discarded catalysts. This is of extreme importance at present due to the shortage of aluminum and nickel used to prepare the catalyst.

We are aware that U. S. P. 2,157,391 by Vanderbilt proposes the use of substantial amounts of carbon dioxide in the catalytic hydrogenation of nitro hydroxy compounds to amino hydroxy compounds. As disclosed in that patent, however, the carbon dioxide functions to neutralize the basic compounds formed during the hydrogenation, thus resulting in the production of carbonic acid salts of the amino hydroxy compounds so that the resulting solution does not become basic to any appreciable extent. Due to the fact that such small quantities of carbon dioxide are used in our new process, it is obvious that we are not using the carbon dioxide for the purpose of neutralizing the basic compounds. While we do not wish to be limited to any particular theory of operation of our invention, we believe the explanation lies in improved catalyst activity over an extended period rather than in tying up reaction products. In the manufacture of the nitro hydroxy compounds for use in hydrogenation procedures, lime is generally employed as a catalyst (U. S. P. 2,135,444 by Vanderbilt). This is neutralized with carbon dioxide and the solids are filtered out. We have believed that even with complete filtration, there is a possibility of bicarbonate decomposition in the concentrating still so that a small amount of precipitated calcium carbonate goes into the autoclave and acts as a slow poison by coating the catalyst. Perhaps the small amount of carbon dioxide can reconvert any carbonate to bicarbonate and keep it in solution so that it does not coat the catalyst.

According to our process, a solvent and suitable hydrogenation catalyst are placed in a reaction vessel of the same general type used in the prior art processes. The small amount of carbon dioxide can be introduced together with this charge to the reaction vessel, or it can be added as a mixture with the hydrogen gas which is subsequently introduced. The temperature is then raised to 40–100° C. The pressure within the vessel is next adjusted to the range 200–2000 pounds per square inch, and the charge saturated with hydrogen gas, or hydrogen gas mixed with small amounts of carbon dioxide if it has not previously been added. The nitro hydroxy compound to be hydrogenated is then pumped into the vessel at a slow, continuous rate. Additional hydrogen gas is added as required to maintain the desired reaction pressure. The rate of introduction of the nitro hydroxy compound is adjusted so that hydrogenation is completed as it enters and the rate of introduction is reduced if at any time the concentration of the nitro hydroxy compound rises substantially above zero.

In accordance with our invention carbon dioxide is added to the hydrogenation apparatus in amounts ranging from about 0.1 to 0.6%, based on the weight of the nitro hydroxy compound to be hydrogenated. Optimum results as to yields and catalyst life are obtained when from about 0.3–0.4% carbon dioxide is used, with no particular advantage resulting from larger amounts. No adverse effect on yields results from the use of amounts of carbon dioxide up to 0.6%, but larger quantities cause difficulties in the distillation which preferably is used to separate and recover the reaction products. We prefer to add the carbon dioxide to the reaction apparatus before hydrogen pressure is applied, because this method is more convenient and facilitates the addition of the proper amount. However, equally good results are obtained if the carbon dioxide is introduced with the hydrogen.

The hydrogenation apparatus used may be any suitable type which comprises a high-pressure reaction vessel equipped with means for introducing the nitro hydroxy compound and hydrogen gas under pressures within the range 200–2000 pounds per square inch. In order to insure thorough mixing of the nitro hydroxy compound, the hydrogen gas, the carbon dioxide, and the catalyst, suitable means should be provided whereby the reactants may be kept in motion, as for example by means of stirrers or other suitable devices, or by maintaining the vessel in motion. The reaction vessel is preferably provided with suitable means for heating or cooling the reaction mixture in order that the hydrogenation may be carried out at the desired temperature.

Due to the fact that certain of the nitro hydroxy compounds are quite viscous, it is usually necessary to add an inert solvent to the reaction vessel along with the catalyst in order to insure better contact between the nitro hydroxy compound, the hydrogen gas, the carbon dioxide and the catalyst. Any suitable solvent or solvent mixture may be used in our process which is chemically inert toward the catalyst and the components of the reaction mixture at the temperature and pressure employed. We prefer to use water or one of the lower aliphatic alcohols. Either anhydrous or aqueous, methyl or ethyl alcohol is a very desirable solvent. The exact nature of the solvent which will secure maximum results will, of course, depend to some extent upon the reaction conditions employed. The relative proportions of solvent to be added, to a given quantity of the nitro hydroxy compound to be hydrogenated, will also depend to some extent upon the particular materials involved and the other reaction conditions. In any particular case preliminary experiments will readily demonstrate the optimum amount of solvent to be used.

We have found, in general, that any suitable hydrogenation catalyst that is active at the desired operative conditions may be used in our process. We prefer to use a finely divided nickel catalyst such as Raney nickel which is prepared as follows: A nickel-aluminum alloy is prepared in finely divided form. The aluminum is dissolved out of this powdered alloy by strong alkali solution. The nickel residue is washed free from alkali and salt with water and kept under liquid. We have found that numerous other hydrogenation catalysts also give excellent results. Platinum and palladium hydrogenation catalysts are particularly adaptable for use in our new process.

The pressure and temperature relationships may be varied for the hydrogenation, depending upon the particular nitro hydroxy compound being hydrogenated and the catalyst that is used in our process. Any pressure within the range of about 200–2000 pounds per square inch may be used. In general, higher pressures require less time for complete hydrogenation to occur, therefore, the rate of feed can be increased as the pressure is increased. The reaction temperature should preferably be maintained within the range of about 40–100° C. In general, high temperatures promote rapid hydrogenations, but if temperatures above 100° C. are used there is a tendency for decomposition to take place. Excellent yields of amino hydroxy compounds are obtained in a minimum of time when temperatures around 80–85° C. are used.

The nitro hydroxy compounds which can be hydrogenated by our new process constitute the nitro hydroxy paraffins and the aryl or cycloalkyl substituted nitro hydroxy paraffins. Among the nitro hydroxy paraffins suitable for use in our process are the nitro alcohols such as 2-nitro-2-methyl-1-propanol, 2-nitro-1-butanol, 2-nitro-1-pentanol, 2-nitro-1-hexanol, 3-nitro-4-heptanol, and 5-nitro-4-octanol, and nitro glycols such as 2-methyl-2-nitro-1, 3-propanediol, 2-ethyl-2-nitro-1,3-propanediol, 2-isopropyl-2-nitro-1,3-propanediol, tris(hydroxymethyl)nitromethane and 2,5-dinitro-2,5-bishydroxymethyl-3,4-diphenyl-1,6-hexanediol. It is to be understood, of course, that my invention is not to be limited to any particular nitro hydroxy paraffins of this series, but may be used with any aliphatic nitro hydroxy paraffins.

The following specific example will further illustrate our invention:

*Example*

A charge containing 15 grams of nickel catalyst, prepared as described above, in enough water to give a catalyst volume of 45 ml., 423 ml. of methanol and one gram of carbon dioxide is introduced into an Adkins type hydrogenation apparatus equipped with flexible tubing for the introduction of hydrogen gas and nitro hydroxy compound under pressure. The bomb is closed and the temperature raised to 70° C. The pressure is then raised to 500 pounds per square inch by the introduction of hydrogen gas under pressure. 2-nitro-2-methyl-1-propanol, in about 70% aqueous solution, is next pumped into the vessel by the use of a Milton Roy pump at a rate of about 60 ml. per hour. A total of 202 ml. of the 2-nitro-2-methyl-1-propanol is introduced over a period of two and one-half hours. Each time the pressure drops to 450 pounds per square inch, hydrogen gas is again introduced to raise the pressure to 500 pounds per square inch.

After separation of the 2-amino-2-methyl-1-propanol produced in accordance with the above procedure, the catalyst is removed by filtration and re-used for hydrogenation of a fresh charge of 2-nitro-2-methyl-1-propanol. The catalyst may be re-used an indefinite number of times in this manner.

We claim:

1. In the catalytic hydrogenation of nitro hydroxy alkyl compounds to the corresponding amino hydroxy compounds, wherein the nitro hydroxy compounds are derived from a process in which lime is employed as a catalyst and wherein the nitro hydroxy compound is continuously introduced into a hydrogenating zone containing hydrogen, maintained at a temperature of from about 40° to 100° C. and containing an initial charge of a hydrogenating catalyst and an inert solvent for the reaction components, said nitro hydroxy compound being introduced at such a rate that the hydrogenating reaction is substantially instantaneous; the method of preventing deactivation of the catalyst with lime compounds and improving the yield which comprises adding carbon dioxide to the hydrogenating zone in an amount within the range of from about 0.1 to 0.6% by weight based on the weight of the nitro hydroxy compound and insufficient to neutralize the basic compounds formed in the process, and recovering the resulting amino hydroxy compounds.

2. In the catalytic hydrogenation of nitro hydroxy alkyl compounds to the corresponding amino hydroxy compounds wherein the nitro hydroxy compounds are derived from a process in which lime is employed as a catalyst, the process which comprises charging a hydrogenating zone with a nickel hydrogenating catalyst, an inert solvent and from about 0.1 to 0.6% of carbon dioxide based on the weight of the nitro hydroxy compound and insufficient to neutralize the amino hydroxy compounds formed in the process, maintaining the temperature of the hydrogenating zone at from about 40° to 100° C., introducing hydrogen at a rate sufficient to maintain the pressure at from about 200 to 2000 pounds per square inch and continuously feeding said nitro hydroxy compound into said zone at such a rate that the hydrogenating reaction is completed substantially instantaneously and the concentration of the nitro hydroxy compound remains about zero, and recovering the resulting amino hydroxy compound.

3. The process of claim 1 wherein the reaction is effected at superatmospheric pressures of 200–2000 pounds per square inch.

4. The process of claim 1 wherein the catalyst used is a nickel hydrogenation catalyst.

EARL J. ELDRED.
KENNETH JOHNSON.

References Cited in the file of this patent

UNITED STATES PATENTS

| Number | Name | Date |
|---|---|---|
| 1,845,759 | Miller | Feb. 16, 1932 |
| 2,157,391 | Vanderbilt | May 9, 1939 |
| 2,166,971 | Schmidt et al. | July 25, 1939 |
| 2,363,464 | Senkus | Nov. 21, 1944 |
| 2,477,943 | Robinson et al. | Aug. 2, 1949 |
| 2,587,572 | Tryon | Feb. 26, 1952 |